(12) United States Patent
Sajnovic

(10) Patent No.: US 12,138,999 B2
(45) Date of Patent: Nov. 12, 2024

(54) SYSTEM AND METHOD FOR CONTROLLING A MOTOR VEHICLE EQUIPPED WITH AT LEAST ONE REMOVABLE COVERING

(71) Applicant: Innovaction Technologies, Epercieux St Paul (FR)

(72) Inventor: Srecko Sajnovic, Roanne (FR)

(73) Assignee: Innovaction Technologies, Epercieux St Paul (FR)

( * ) Notice: Subject to any disclaimer, the term of this patent is extended or adjusted under 35 U.S.C. 154(b) by 1003 days.

(21) Appl. No.: 16/756,768

(22) PCT Filed: Oct. 4, 2018

(86) PCT No.: PCT/EP2018/077004
§ 371 (c)(1),
(2) Date: Oct. 15, 2020

(87) PCT Pub. No.: WO2019/076641
PCT Pub. Date: Apr. 25, 2019

(65) Prior Publication Data
US 2021/0188063 A1     Jun. 24, 2021

(30) Foreign Application Priority Data
Oct. 16, 2017   (FR) ...................... 1759675

(51) Int. Cl.
*B60J 7/12*        (2006.01)
*E05F 15/627*      (2015.01)
*E05F 15/70*       (2015.01)

(52) U.S. Cl.
CPC ............. *B60J 7/1204* (2013.01); *E05F 15/70* (2015.01); *E05F 15/627* (2015.01);
(Continued)

(58) Field of Classification Search
CPC .... E05F 17/70; E05F 17/41; B60J 7/02; B60J 7/08; B60J 7/1204
See application file for complete search history.

(56) References Cited

U.S. PATENT DOCUMENTS 4,585,981 A      4/1986  Zintler
5,257,850 A  *  11/1993  Brim .................. B60R 9/00
                                                296/100.12
(Continued)

FOREIGN PATENT DOCUMENTS

DE    10 2015 000 396 A1    7/2016
EP        2 338 717 A2      6/2011
(Continued)

OTHER PUBLICATIONS

Machine translation of SE 1250537 A1 (Year: 2013).*
(Continued)

*Primary Examiner* — Hussein Elchanti
*Assistant Examiner* — Kenneth M Dunne
(74) *Attorney, Agent, or Firm* — CHRISTENSEN O'CONNOR JOHNSON KINDNESS PLLC

(57) ABSTRACT

A truck equipped with at least one removable covering configured so as to cover or uncover the roof and/or at least one side of the truck, where the truck is fitted with a control system including a road navigation aid system comprising a stored position, a positioning device configured to determine a position of the truck, at least one means for comparing the position of the truck with the stored position according to a position threshold so as to determine that the truck has crossed a limit of a loading/unloading area, and a control means being configured to control opening the removable covering when the truck is in a loading/unloading area as determined by the at least one comparison means, the control means configured to control closing the removable
(Continued)

covering when the truck is outside the loading/unloading area as determined by the at least one comparison means.

10 Claims, 1 Drawing Sheet

(52) U.S. Cl.
CPC ....... *E05Y 2400/32* (2013.01); *E05Y 2400/40* (2013.01); *E05Y 2900/516* (2013.01)

(56) References Cited

U.S. PATENT DOCUMENTS

| | | | | |
|---|---|---|---|---|
| 5,354,113 A | * | 10/1994 | Pettersson | ................. B60P 7/04 |
| | | | | 296/100.12 |
| 2004/0008001 A1 | * | 1/2004 | Kikuta | ................. H02H 7/0851 |
| | | | | 318/466 |
| 2008/0100241 A1 | * | 5/2008 | Takahashi | ............... E05F 15/41 |
| | | | | 318/434 |
| 2008/0234894 A1 | * | 9/2008 | Nomura | ................. B60J 7/0573 |
| | | | | 701/36 |
| 2013/0061523 A1 | * | 3/2013 | Mankame | ................ B60J 7/022 |
| | | | | 74/89.14 |
| 2017/0072375 A1 | * | 3/2017 | Seghers | .................. B28C 5/422 |
| 2017/0217293 A1 | * | 8/2017 | Kim | ......................... B60J 7/068 |
| 2017/0342760 A1 | * | 11/2017 | Be | ........................... E05F 15/70 |
| 2018/0147923 A1 | * | 5/2018 | Liu | ....................... F16H 37/041 |
| 2019/0043370 A1 | * | 2/2019 | Mulhall | .................... B64F 1/32 |
| 2019/0179315 A1 | * | 6/2019 | Marukawa | .............. E05F 15/70 |

FOREIGN PATENT DOCUMENTS

| | | | |
|---|---|---|---|
| EP | 2 338 717 A3 | 9/2013 | |
| SE | 1250537 A1 * | 11/2013 | ............ E21F 13/006 |
| WO | 2014/012895 A1 | 1/2014 | |
| WO | 2016/205860 A1 | 12/2016 | |
| WO | 2017/100716 A1 | 6/2017 | |

OTHER PUBLICATIONS

International Search Report mailed Nov. 22, 2018, issued in corresponding International Application No. PCT/EP2018/077004, filed Oct. 4, 2018, 6 pages.

* cited by examiner

SYSTEM AND METHOD FOR CONTROLLING A MOTOR VEHICLE EQUIPPED WITH AT LEAST ONE REMOVABLE COVERING

The technical field of the invention is removable covering systems, and in particular the control of such systems.

A removable covering system allows the load bed or trailer of a truck to be covered or uncovered by moving rods inserted into a tarp cover. The rods are generally held by a rail and fastened to a drive cable that allows them to be moved in one or other direction under the action of a motor.

In the prior art, patent application FR1256895, which discloses a removable covering for a truck load bed, is known.

Although it allows the load bed to be opened and closed more reliably than in the prior art, the removable covering system described in this document needs to be activated by the driver. However, it is common for these covering systems not to be activated by the driver, by mistake or due to a lack of time or because of a lack of interest in the resultant benefits.

Moreover, the automation of the first goods vehicles allows the gradual disappearance of drivers to be foreseen. In such a case, it will remain necessary for the load bed or trailer to be covered or uncovered when an automated truck departs from or arrives at the loading site.

There is therefore a need for a system for controlling a removable covering the actuation of which is at least partially automated.

One subject of the invention is a system for controlling a motor vehicle equipped with at least one removable covering, comprising at least one means for comparing at least one operating parameter of the vehicle to a threshold so as to determine whether the vehicle has crossed a limit of a loading/unloading zone in which the removable covering must be open, and a control means suitable for transmitting a switching signal to the removable covering depending on the signal received from the at least one comparing means.

The vehicle may be equipped with an electronic control unit suitable for transmitting, on request, the speed of movement of the vehicle, the control system comprising a first comparing means suitable for comparing the speed of movement of the vehicle to a speed threshold characteristic of a movement of the vehicle on road and for transmitting a signal to the control means when the speed of the vehicle crosses the speed threshold.

The vehicle may be equipped with a positioning device suitable for determining the position of the vehicle,
 the control system comprising a second comparing means suitable for periodically comparing the position of the vehicle with a position stored in memory and for transmitting a signal to the control means when the distance between the two positions crosses a predefined distance threshold.

The removable covering system may be equipped with a means for locating the position of the removable covering,
 the control system comprises a third means for comparing the position of the removable covering to a preset position of the removable covering, which is received from the means for locating the position of the removable covering, and suitable for transmitting a signal to the control means when the position of the removable covering corresponds to the preset position, and a memory,
 the control means being suitable for storing in the memory the position of the vehicle on the first reception of the signal from the third comparing means after a preset time period.

The preset position of the removable covering may be the open or closed position.

The position stored in memory of the vehicle may be a position of the vehicle received from the operator.

The removable covering system may be equipped with a means for locating the position of the removable covering and with a fourth means for comparing the position of the removable covering received from the position-locating means to the position required by the switching signal,
 the fourth comparing means also being suitable for stopping the switching signal intended for the removable covering if the position of the removable covering received from the means for locating the position of the removable covering corresponds to the position required by the switching signal.

The removable covering system may be equipped with a means for measuring return force, making it possible to determine whether an object is opposing the movement of the removable covering,
 the control system then comprising a fifth comparing means suitable for comparing the return-force measurement to a damage force threshold value and for transmitting a signal to the control means if the return-force measurement is higher than the threshold value,
 the control means then being suitable for transmitting a signal for stopping the removable covering on reception of the signal from the fifth comparing means.

The control system may comprise transmitting means suitable for transmitting an error signal to an operator when the control means receives a signal from the fifth comparing means.

The control system may comprise receiving means suitable for receiving a signal from an operator,
 the control means then being suitable for interrupting the transmission of switching signals to the removable control on reception of a signal from an operator signaling an oversized load by the receiving means.

The operator may be the driver of the vehicle, the remote driver of the vehicle, which is piloted like a drone, or the program or system that drives the autonomous or semi-autonomous vehicle.

Another subject of the invention is a method for controlling a motor vehicle equipped with at least one removable covering, comprising steps in which at least one operating parameter of the vehicle is compared to a threshold so as to determine whether the vehicle has crossed a limit of a loading/unloading zone in which the removable covering must be open, and a switching signal is transmitted to the removable covering depending on the comparison.

Other aims, features and advantages of the invention will become apparent on reading the following description, which is given solely by way of nonlimiting example and with reference to the appended drawings, in which.

Figure 1:
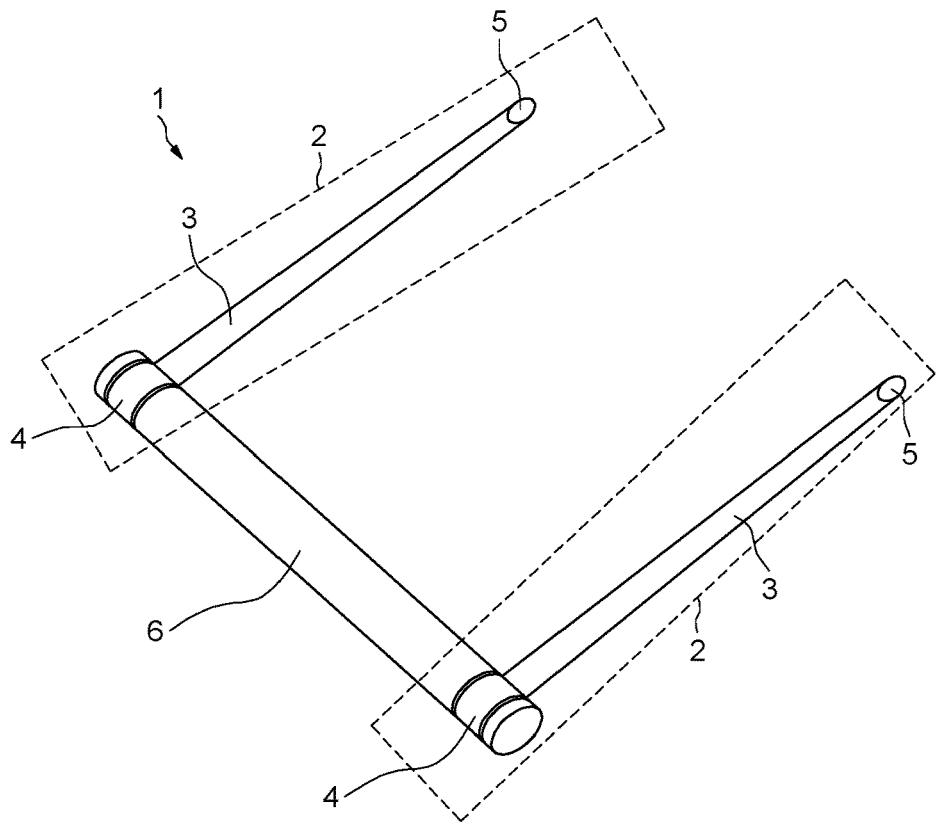
FIG. 1 illustrates the main elements of a removable covering system.

FIG. 1 illustrates a removable covering system according to document FR1457845. The removable covering system 1 comprises two moving devices 2, each comprising a drive cable 3 that interacts with one portion of a front wheel 4 and a back wheel 5. The drive cable 3 supports rods that are inserted into a tarp. A motor 6 allows the cables 3 to be driven via the front wheels 4. It will be noted that the motor 6 and the front wheels 4 are contained in the same element. Mention will be made, by way of example, of a cylinder equipped with wheels at its ends and with an axial motor inserted into its interior volume. Via their movements, the drive cables 3 allow the rods and the tarp to be moved, covering or uncovering the load bed depending on the direction of movement.

Unlike the prior art, such a removable covering system 1 allows a loss in tension of the drive cables 3 to be avoided.

The rods of the removable covering system are supple and deformable. In other words, the rods are flexible and able to deform elastically under an impact. On deforming, the flexible rods absorb most of an impact, minimizing the amount of energy transmitted to the rest of the system. Thus minimized, impacts have an even smaller influence on the tension of the drive cables 3. The flexible rods may be made, for example, of composites.

Figure 2:
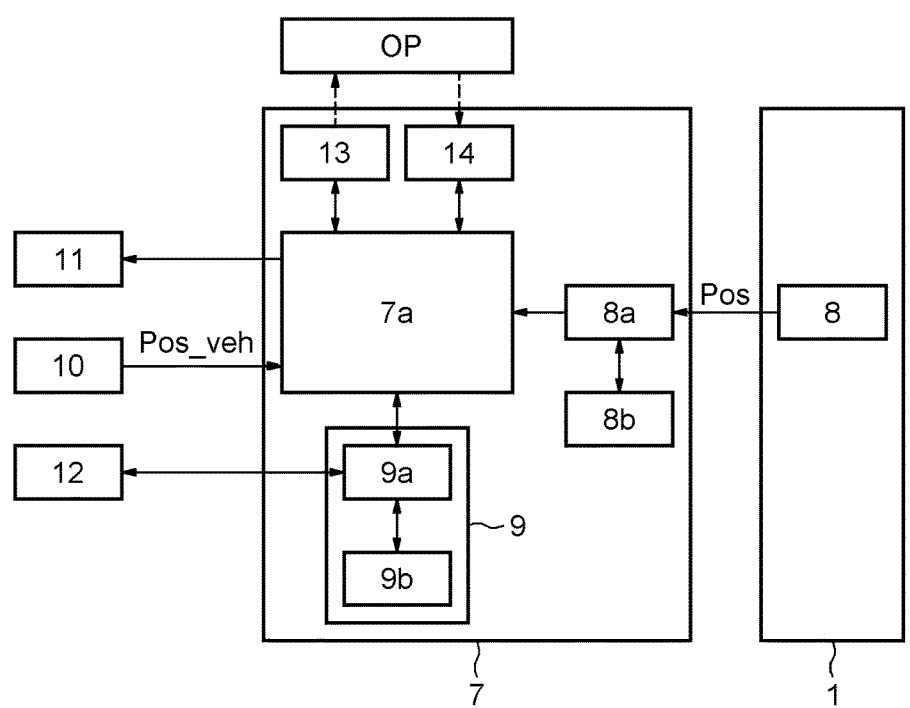
FIG. 2 illustrates the main elements of a removable-covering control system.

In order for the deployment of the removable covering to require only a minimal intervention on the part of the operator, a control system 7 allowing the closure of the removable covering 1 to be switched automatically is provided. Such a control system is illustrated in FIG. 2.

The control system 7 comprises a control means 7a connected to the removable covering system 1 in order to be able to actuate the closure thereof either via direct control of the motor 6 or via an actuator of the motor 6, and connected to the electronic control unit 9 of the vehicle.

The control means 7a periodically requires the speed Vveh of movement of the vehicle from the electronic control unit 9.

The control system 7 comprises a first means 9a for comparing the speed Vveh of the vehicle to a speed threshold. When the vehicle reaches a speed higher than a speed threshold characteristic of a movement on road, for example 40 km/h, the vehicle is considered to have left the loading zone. When such is the case, the first comparing means 9a transmits a signal to the control means 7a, which then transmits a close signal to the removable covering system 1.

In one particular embodiment, the control means 7a is connected to a positioning device 10 suitable for determining the position Pos_veh of the vehicle.

The control system 7 comprises a second means 10a for comparing the position Pos_veh of the vehicle to a position stored in memory.

When the distance between the position Pos_veh of the vehicle and the position Pos_open stored in memory becomes higher than a predefined distance threshold, the vehicle is considered to have exited from the loading zone, and the control means 7a transmits a signal to close the removable covering.

The position stored in memory may be stored in the memory of and/or defined in a system 11 for assisting with road navigation, in particular before the vehicle departs, or be received from the operator.

In order to define the position stored in memory, the control system 7 may periodically require the position of the vehicle, and the position of the removable covering. When, for the first time, after a preset period, for example after the last closure of the removable covering, a signal indicates that the removable covering is open, for example via the third comparing means 8a, the control means 7a stores the position of the vehicle in a memory 7b. In order to determine the time at which the signal is received from the third comparing means 8a, an internal clock and additional memory-storage and comparing means may be required.

Alternatively, the control system may take into account the difference in distance between the position Pos_open stored in memory and the position Pos_veh of the vehicle with respect to the distance threshold and the comparison of the speed of the vehicle Vveh with respect to the speed threshold, when concluding whether the vehicle is sufficiently far from the loading site and has reached an on-road speed of movement to close the removable covering.

The control means 7a then combines the signals received from the first comparing means 9a and from the second comparing means 10a, via for example an AND logic operator. This embodiment allows the distance threshold to be decreased so that the removable covering is closed more rapidly.

The control of the removable covering described above may however fail if the load of the vehicle exceeds the depth of the load bed covered by the removable covering, or if one portion of the load protrudes from a trailer equipped with such a removable covering system. In such a case, the periodic request to close the removable covering made by the control system could lead to damage or to destruction of the removable covering because of impacts of the rods against the oversized load. Although flexible rods are provided in the removable covering system, repeated impacts could cause them to break.

Provision is thus made for the removable covering system 1 to be equipped with a means 12 for measuring return force, which makes it possible to determine whether an object is preventing the movement of the removable covering. In such an embodiment, the control system 7 comprises a fifth means 12a for comparing the return-force measurement to a damage force threshold value and that transmits an error signal if the return-force measurement is higher than or equal to a damage force threshold value.

If such is the case, the fifth comparing means 12a transmits an error signal to the control means 7a, which in turn transmits a stop signal to the removable covering system 1 and a fail signal to the operator OP. The control system 7 thus allows damage of the removable covering to be avoided while informing the operator OP.

By operator, what is meant is the driver of a conventional vehicle, the remote driver of a vehicle driven like a drone, or the program or system that drives the vehicle when the latter is autonomous or semi-autonomous.

The control system 7 may comprise receiving means 14, such as a radiofrequency antenna and the corresponding decoding means, allowing a signal originating from the operator OP and signaling an oversized load to be received. On reception of such a signal, the control means 7a interrupts its interactions with the removable covering system 1 until a signal indicating that the oversized load has been unloaded is received.

In one particular embodiment, the removable covering system 1 is equipped with a means 8 for locating the position of the removable covering, such as the association of a coder notch and a corresponding detector, and a fourth means 8b for comparing the position of the removable covering received from the means 8 for locating the position of the removable covering corresponds to the position required by the switching signal originating from the control means 7a and intended for the removable covering.

By position of the removable covering, what is meant is the open position, the closed position, an openness of several percent (between 0% and 100%) of the removable covering or a closedness of several percent (between 100% and 0%) of the removable covering.

The fourth comparing means 8*b* then allows the transmission of the close signal to the removable covering system 1, so that the removable covering is brought to a closed position only if the position Pos is different from the required closed position. The fourth comparing means 8*b* may for example be the association of a means for comparing the closed position to the position of the control signal, the output of which is connected to the gate of a transistor that receives as input the close signal of the control means 7*a* and the output of which is connected to the removable covering 1.

The closure of the removable covering by the control system was described above. However, elements and similar steps may be associated with the opening of the removable covering. It follows therefrom that the distance and speed thresholds defined for the opening may differ from the distance and speed thresholds used when closing.

Moreover, although the removable covering has a quite rapid movement, opening the removable covering before reaching the unloading or loading site allows time to be saved during intensive transportation operations, such as are commonly encountered in civil engineering.

The system for controlling a vehicle equipped with a removable covering was described above with respect to a vehicle equipped with a load bed the aperture of which is closed by the removable covering.

The invention also applies to a vehicle equipped with a trailer closed by at least one removable covering, on the roof and/or on at least one side of the vehicle.

The invention lastly applies to a vehicle the roof and/or at least one side of which are closed by at least one removable covering.

The invention claimed is:

1. A truck, comprising:
    at least one removable covering configured to cover a roof of the truck, the removable covering comprising two rods inserted into a tarp cover, wherein the rods are flexible and configured to elastically deform; and
    a control system comprising:
    at least one means for comparing a position of the truck with a stored position to determine that the truck has crossed a limit of a loading/unloading area,
    an antenna configured to receive an oversized signal from an operator, and
    a control means configured to open the removable covering when the truck is in a loading/unloading area, close the removable covering when the truck is outside the loading/unloading area, and prevent the removable covering from closing when the oversized signal is received.

2. The truck according to claim 1, further comprising:
    an electronic control unit configured to transmit, upon request, a speed of the truck,
    wherein the control system further comprises:
    a first comparison means configured to compare the speed of the truck with a speed threshold, and emit a signal to the control means when the speed of the truck exceeds the speed threshold.

3. The truck according to claim 1, wherein the removable covering further comprises a means for locating a position of the removable covering,
    wherein the control system further comprises:
    a memory, and
    a third comparison means configured to compare the position of the removable covering with a predetermined position of the removable covering, and to emit a signal to the control means when the position of the removable covering corresponds to the predetermined position,
    wherein the control means is further configured to store the position of the truck for a predetermined period of time in the memory when the position of the removable covering corresponds to the predetermined position.

4. The truck according to claim 3, wherein the predetermined position of the removable covering is an open position or a closed position.

5. The truck according to claim 1, wherein the stored position of the truck is a position of the truck received from the operator.

6. The truck according to claim 1, wherein the control system further comprises:
    a means for locating the position of the removable covering, and
    a fourth comparison means for comparing the position of the removable covering received from the position locating means to a position directed by a switching signal, wherein the fourth comparison means is further configured to stop the switching signal when the position of the removable covering corresponds to the position directed by the switching signal.

7. The truck according to claim 1, wherein the control system further comprises:
    a fifth comparison means configured to compare the driving force with a damage force threshold value the driving force being determined when the removable cover moves to a closed position, the fifth comparison means being configured to emit a signal to the control means if the driving force is greater than the damage force threshold value,
    wherein the control means is further configured to stop the removable covering when the driving force is greater than the damage force threshold value.

8. The truck according to claim 7, wherein the control system is further configured to emit an error signal when the driving force is greater than the damage force threshold.

9. The truck according to claim 1 wherein the operator is a driver of the truck, a remote driver of the truck, a program that drives the truck, or a system that drives the truck.

10. A method for controlling the truck according to claim 1, comprising:
    determining the position of the truck;
    comparing the position of the truck with a stored position to determine when the truck has crossed a limit of a loading/unloading area;
    opening the removable covering when the truck is in the loading/unloading area;
    closing the removable covering when the truck is outside the loading/unloading area;
    determining whether an oversized load signal was received by the antenna; and
    when the oversized load signal is received, preventing the removable covering from closing.

* * * * *